United States Patent [19]

Meyer

[11] Patent Number: 5,639,965
[45] Date of Patent: Jun. 17, 1997

[54] OIL RECLAMATION SYSTEM FLOW METER

[75] Inventor: Robert A. Meyer, Boynton Beach, Fla.

[73] Assignee: T/F Purifiner, Inc., Boynton Beach, Fla.

[21] Appl. No.: 689,871

[22] Filed: Aug. 15, 1996

[51] Int. Cl.⁶ .................................................. G01F 1/20
[52] U.S. Cl. .................................................. 73/216
[58] Field of Search ................... 73/3, 216, 215, 73/861.57; 222/442; 137/575

[56] References Cited

U.S. PATENT DOCUMENTS

| | | |
|---|---|---|
| 1,049,718 | 1/1913 | Howard . |
| 2,697,944 | 12/1954 | Wenham . |
| 3,001,397 | 9/1961 | Leonard . |
| 3,487,808 | 1/1970 | Perkins . |
| 3,707,983 | 1/1973 | Butler . |
| 3,859,854 | 1/1975 | Dye et al. ........................ 73/215 |
| 3,871,230 | 3/1975 | Dye et al. . |
| 3,929,412 | 12/1975 | Villari ............................. 73/215 |
| 4,061,031 | 12/1977 | Grimsrud . |
| 4,346,596 | 8/1982 | Diamant et al. . |
| 4,433,577 | 2/1984 | Khurgin et al. . |
| 4,452,176 | 6/1984 | Hoefelmayr et al. . |
| 4,476,719 | 10/1984 | Millar et al. .................... 73/215 |
| 4,523,464 | 6/1985 | Pedersen et al. ................ 73/216 |
| 5,313,833 | 5/1994 | Hoefelmayr . |

*Primary Examiner*—Richard Chilcot
*Assistant Examiner*—Jewel V. Artis
*Attorney, Agent, or Firm*—Quarles & Brady

[57] ABSTRACT

An oil reclamation system flow meter for measuring the flow rate of a oil through the system wherein a housing forms a first chamber that leads through a constricted lower outlet into a second chamber and the second chamber. The first chamber also includes an intermediate outlet above the lower outlet and an upper outlet above the intermediate outlet. Both the intermediate and upper outlets flow into a duct that opens into the second chamber at a lower end. Oil flows through an inlet into the first chamber and through the lower outlet when the rate is below an ideal rate range, through both the lower outlet and the intermediate outlet when the rate is within the ideal range and through all three outlets when the rate exceeds the ideal range. A viewing conduit indicates the level of oil inside the first chamber and thereby indicates flow rate.

18 Claims, 2 Drawing Sheets

5,639,965

OIL RECLAMATION SYSTEM FLOW METER

FIELD OF THE INVENTION

The present invention relates to oil flow measurement devices and more particularly to a device for visually indicating the rate of oil flow through an oil reclamation system.

BACKGROUND OF THE INVENTION

Flow meters for indicating the rate of liquid flow through a conduit are known in various forms. In most flow measurement applications, a flow meter must be configured so that it can distinguish among various flow rates along a continuous flow rate spectrum (e.g. between 1 and 10 gallons per minute (gpm)).

Two flow meters that are capable of indicating flow rates along a spectrum are described in U.S. Pat. Nos. 4,523,464 and 3,001,397. Each of these two meters relies on a liquid level within a measurement chamber having a restricted outlet at its lower end. The liquid level within the chamber is associated with a specific outlet flow rate.

In other applications, it is advantageous if only a small number of flow rates, as opposed to a continuous spectrum of rates, is indicated. For example, in oil reclamation applications in which a portion of total oil flow in an engine system is routed for liquid and solid decontamination, there may only be a small ideal range of flow rates (e.g. between three and four gpm).

In these applications, a preferred meter should operate in a distinct and easily identifiable manner when the flow rate is within the ideal range so that an observer can easily identify if the flow rate is within the ideal range. The flow indication should be rugged in operation and not readily susceptible to extreme fluctuations that may be induced by viscosity changes, system vibrations and other factors. To this end, a large change in indicator status when the flow rate transitions into or out of an acceptable range, rather than minute, incremental changes to slight variations in flow rate, is particularly advantageous.

Unfortunately, the meters described in the patents referenced above operate in the same manner regardless of flow rate. As flow rate increases, liquid level increases. In some embodiments, as flow rate increases, the liquid level rate of increase decreases. Thus, these meters are incapable of providing a large, quantum change in indicator status when the flow rate transitions into or out of an acceptable range.

In these meters differences in liquid viscosity (viscosity results in shearing stress caused by flow velocity) dramatically affect flow rate. For this reason these meters must be calibrated to account for the specific viscosity of the liquid passing therethrough.

Moreover, liquid viscosity can change as a function of ambient conditions, such as temperature. For example, the shear stresses associated with oil at a low temperature are greater than the stresses at a high temperature. Because the meters above must be calibrated as a function of liquid viscosity, where liquid viscosity changes, the meters would be inaccurate unless recalibrated.

Therefore, it would be advantageous to have an oil flow rate meter that could provide a large change in indicator status when the flow rate transitions into or out of an acceptable range and that can operate relatively accurately despite different oil viscosities, temperature variations and other environmental fluctuations.

SUMMARY OF THE INVENTION

The invention is directed to an oil flow meter connectible between two conduits for measuring the flow of oil therethrough. The meter comprises a first housing forming a first chamber, an inlet leading into the first chamber and lower, intermediate and upper outlets leading out of the first chamber, the intermediate outlet formed above the lower outlet and the upper outlet formed above the intermediate outlet. The inlet preferably has a greater minimum cross sectional area than the first chamber. The lower outlet provides a constricted discharge with a predetermined flow capacity.

A second housing forms a bypass duct, the first chamber leading into the duct through both the intermediate and upper outlets. The duct forms a duct outlet below the intermediate outlet. A third housing forms a second chamber below both the first chamber and the duct, the first chamber leading into the second chamber through the lower outlet and the duct leading into the second chamber through the duct outlet. The second chamber has a greater minimum cross sectional area than the first chamber. In one preferred aspect, the first, second and third housings are formed by a single housing. The meter also includes means for determining the oil level in the first chamber.

One object of the invention is to provide a meter that can accurately provide a relatively stable indicator status when a flow rate operates within a predetermined acceptable range. With the present meter, when an inlet flow rate exceeds the flow rate that can pass through the constricted outlet of the first chamber, a pooling effect takes place until the pooled oil reaches the intermediate outlet. At this point, the excess flow passes through the intermediate outlet and the duct into the second chamber. In this way, the oil level rate of increase inside the chamber is reduced substantially once the oil level reaches the intermediate outlet.

If the flow rate increases further, at some point the flow rate exceeds the flow that can pass through both the constricted outlet of the first chamber and the intermediate passage. At this point, the oil level within the chamber again increases rapidly until the oil level reaches the level of the upper outlet. Thus, three distinct ranges of oil flow are clearly marked and observable using the present invention.

Another object is to provide an accurate meter that is inexpensive. By forming the first chamber, second chamber and duct from a single housing material, costs are minimized.

Preferably, the inlet is proximate the top of the first chamber, the lower outlet is proximate the bottom of the first chamber and the first and second chambers are substantially vertical.

In another preferred aspect, the housing also forms two apertures from the first chamber through the housing and the means for determining the height of the oil includes a non-opaque conduit secured to and traversing the distance between the two apertures. An upper of the two apertures should be formed above the inlet and a lower of the two apertures should be formed between the lower and intermediate outlets. Visible range markings can be provided on the conduit which relate oil level therein to flow rate.

In yet another preferred aspect, the intermediate outlet forms a passage that is angled from the first chamber to the duct.

Preferably, the first chamber is vertically oriented and has a substantially uniform horizontal cross sectional area. Here, the meter may be used to indicate if oil flow rate therethrough is within an ideal range, the ideal range defined by a minimum flow rate and a maximum flow rate. To this end, the cross sectional area of the first chamber constricted outlet may be dimensioned so that the highest rate of flow therethrough prior to a pooling of oil in the first chamber below the intermediate outlet is equal to the minimum flow rate and the intermediate outlet may be dimensioned so that the highest rate of flow therethrough prior to a pooling of oil thereabove is equal to the maximum flow rate less the minimum flow rate.

In keeping with the object of providing a clear indication of when the flow rate is within an ideal range, by forming the first chamber with a substantially uniform horizontal cross sectional area, the rate of oil height level change can be made to vary quickly at the boundaries of the ideal flow range and only minimally when the rate is within the ideal range. This makes it easier for an observer to identify operation within the ideal range.

Other and further objects and aspects of the present invention will become apparent during the course of the following description and by reference to the accompanying drawings.

DESCRIPTION OF THE PREFERRED EMBODIMENT

Figure 1:
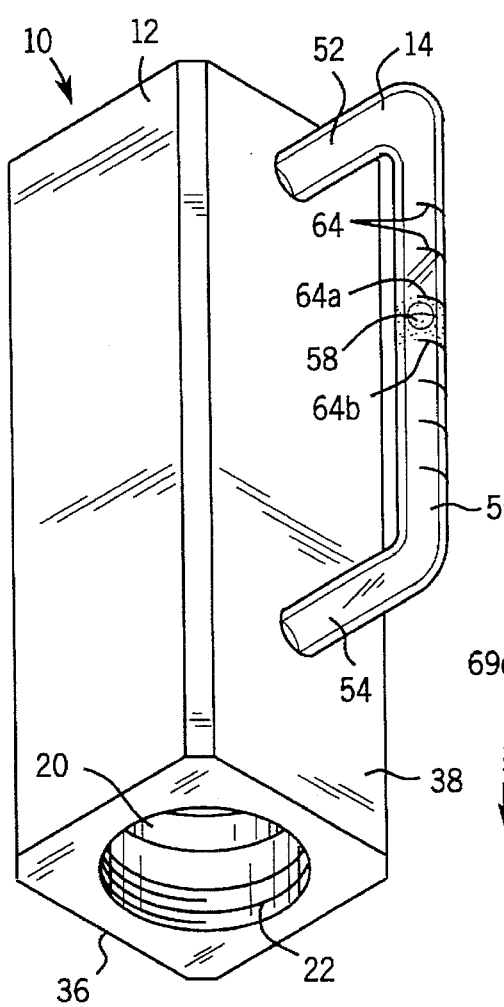
FIG. 1 is a perspective view of a flow meter according to the present invention.
Figure 3:
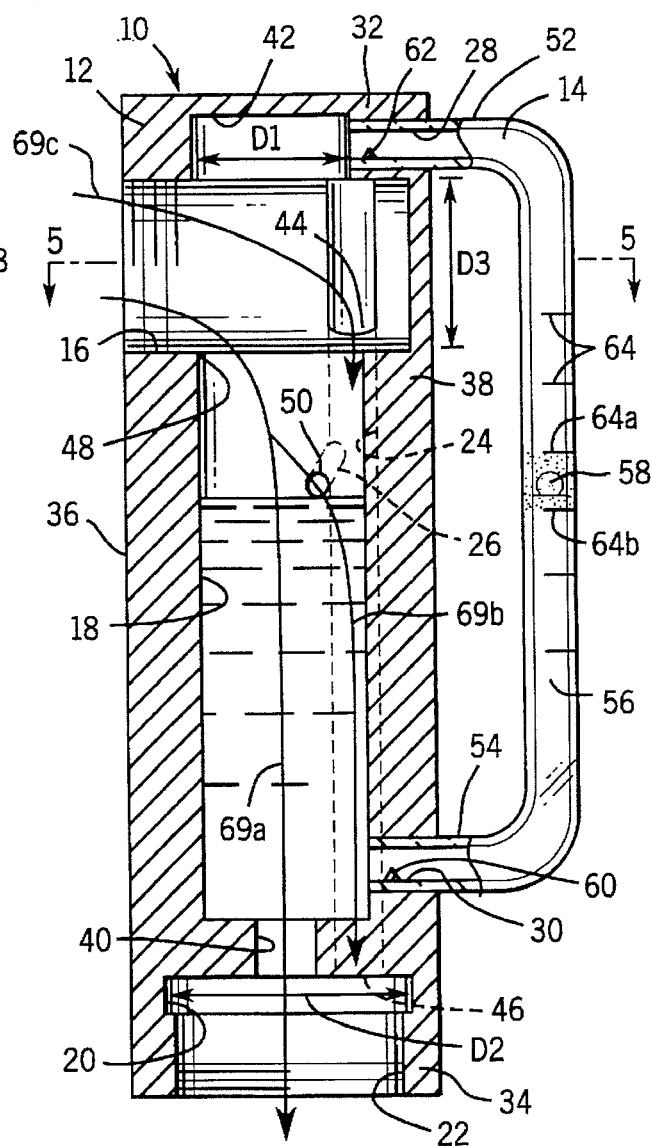
FIG. 3 is a cross-sectional view of the flow meter in FIG. 2 taken along the line 3—3.
Figure 4:
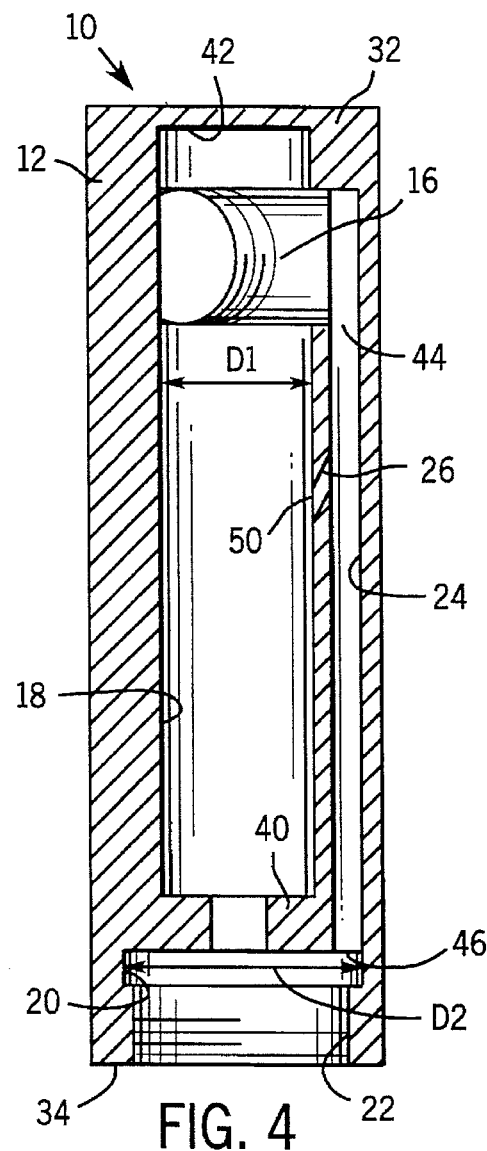
FIG. 4 is a cross-sectional view of a flow meter shown in FIG. 2 taken along the line 4—4.
Figure 5:
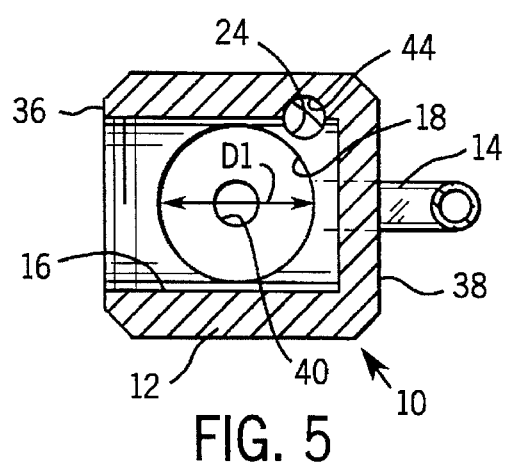
FIG. 5 is a cross-sectional view of the flow meter shown in FIG. 3 taken along the line 5—5.

Referring now to FIG. 1, a preferred embodiment of the inventive flow meter 10 includes a housing 12 and a level viewing conduit 14. Referring also to FIGS. 3, 4 and 5, the housing 12 is preferably a single block of rigid material that forms a housing inlet 16, a first chamber 18, a second chamber 20, a housing outlet 22, a bypass duct 24, a passageway 26, and upper and lower apertures 28, 30, respectively.

The block of material that forms the housing 12 is preferably elongate and has an upper end 32, a lower end 34, and for the purposes of describing the present embodiment, is defined by two lateral and oppositely facing side walls 36 and 38, respectively.

Referring to FIGS. 2–5, the first chamber 18 is cylindrical, preferably has a uniform diameter D1 along its entire length and extends from the housing upper end 32 to a lower constricted outlet 40 which opens into the second chamber 20 therebelow, an upper end 42 of the first chamber 18 being enclosed by the upper end 32 of the housing 12. The constricted outlet 40 is dimensioned to accommodate a predetermined range of flow rates from zero up to a capacity flow rate, for example, 3 gph, above which the oil flow pools in the first chamber 18.

Referring specifically to FIGS. 3 and 4, the second chamber 20, like the first chamber 18, is preferably cylindrical along its vertical length and has a uniform diameter D2 that can be greater than the first chamber diameter D1. The second chamber 20 opens into the housing outlet 22 therebelow.

The housing inlet 16 is formed proximate the housing upper end 32 and extends horizontally through side wall 36 perpendicular to the length of the first chamber 18, intersecting the first chamber 18 below the first chamber upper end 42. The housing inlet 16 is preferably cylindrical having a uniform diameter D3 along its length that can be greater than the first chamber diameter D1. Outer ends of both the housing inlet 16 and housing outlet 22 are threaded for connection to other suitable conduits or pipes through which oil flow rate is to be measured.

Referring to FIGS. 2–5, the duct 24 is preferably cylindrical, parallel to the first chamber 18 and does not intersect the first chamber 18. The housing inlet 16 opens into an upper end of the duct 24 through an upper outlet 44. At its lower end, the duct 24 opens into the second chamber 20 through a duct outlet 46. Referring specifically to FIG. 3, preferably, the upper outlet 44 is vertically above a lowermost edge 48 of the housing inlet 16.

Figure 2:
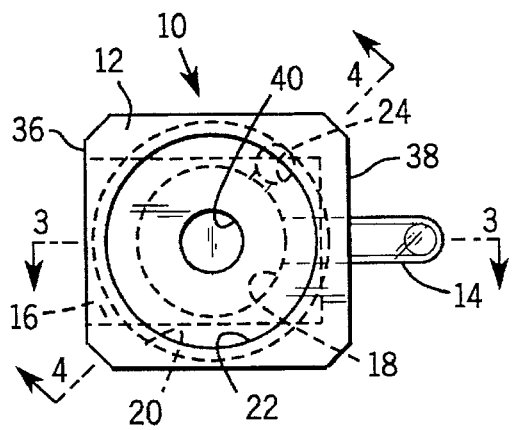
FIG. 2 is a bottom plan view of the flow meter in FIG. 1.

Referring to FIGS. 2, 3 and 4, the housing 12 forms the passageway 26 between the first chamber 18 and the duct 24. Preferably, the passageway 26 slopes upwardly (e.g. at a 60° angle) from the first chamber 18 to the duct 24. The preferred upward inclination prevents inadvertent, premature drainage into the by pass duct 24 and reduces the opportunity for vapor lock. The passageway 26 is formed between the housing inlet 16 and the lower outlet 40 and defines an intermediate outlet 50 from the first chamber 18. Preferably, the intermediate outlet 50 is formed approximately half-way along the length of the first chamber 18.

The upper aperture 28 opens through the housing side wall 38 and into the first chamber 18 above the housing inlet 16. The lower aperture 30 opens through the housing side wall 38 and into the first chamber 18 just above the lower outlet 40 and, preferably, well below the intermediate outlet 50.

The level viewing conduit 14 is formed of a non-opaque material such as a clear plastic or tempered glass tube. The conduit 14 includes an upper horizontal end 52, a lower horizontal end 54 and a vertical elongated viewing portion 56 that traverses the distance between the two horizontal ends 52, 54, respectively. The horizontal ends 52, 54 are formed so that they can be received in the upper and lower apertures 28, 30, respectively. The horizontal ends 52, 54 can be secured in the apertures 28, 30 in any manner known in the art (e.g. threaded fitting, epoxy, or some other type of adhesive).

A float ball 58 is preferably provided inside the conduit 14 to improve visibility of the oil level when the conduit 14 is obscured by oil film and the like. The float ball 58 is sized so it can easily move up and down within the viewing portion 56. Referring to FIG. 3, two stops 60 and 62 can be provided, one in either horizontal end 54, 56 that extend inwardly into the conduit 14 so as to block the float ball 58 so that the float ball 58 remains within the conduit 14. Referring to FIGS. 1 and 3, level markings 64 can be provided on the viewing portion 56 that correspond to various flow rates through the meter 10.

The diameter or other cross sectional dimension of the constricted outlet 40 is chosen so that a first oil flow up to a predetermined rate can pass therethrough unobstructed. Similarly, the intermediate outlet 50 and associated passageway 26 are formed so that a second flow rate can pass therethrough without excessive impedance from oil viscosity.

To simplify explanation of operation of the inventive flow meter, it will be assumed that the present flow meter is to be used to measure the rate of oil flow in a filtration process wherein an ideal flow rate is between 3 and 4 gallons of oil per minute. In this case, the inventive meter should ideally and clearly indicate when the flow rate is below 3 gpm, when the flow rate is between 3 and 4 gpm, and when the flow rate is above 4 gpm. To this end, the constricted outlet 40 should have a dimension that can pass up to 3 gpm of oil. In addition, the intermediate outlet 50 and associated passageway 26 should have a diameter or other cross-section that passes a range of approximately 1 gpm.

In this case, the first chamber 18 and passageway 26 together would pass 4 gpm of oil.

To help an observer identify when the flow rate is within the ideal range, in the present example, between 3 and 4 gpm, two level markings 64a and 64a, one slightly above and one slightly below the intermediate outlet 50 are provided on the viewing portion 58.

In operation, it will be assumed that initially passes an inlet flow rate of approximately 2 gpm. In this case, oil entering the inlet 16 follows the path identified by arrow 69a and passes over the lower-most edge 48 of the inlet and down through the first chamber 18. Because the 2 gpm flow rate is less than the maximum (i.e. 3 gpm) flow rate that can pass through the constricted outlet 40 the oil passes through the first chamber 18 the and lower outlet 40 into the second chamber 46 before it exits the flow meter 10.

In this case, the float ball 58 remains at the bottom of the viewing conduit 14, in its lower horizontal end 54. An observer viewing the ball 58 at the lower end 54 can surmise that the flow rate through the meter is below 3 gpm and therefore not within the ideal 3 to 4 gpm range. The observer can then adjust the system to correct the flow rate accordingly.

Assuming that the flow rate is adjusted upwardly so that the rate exceeds 3 gpm, immediately when the rate exceeds 3 gpm, the volume of oil passing through the first chamber 18 exceeds the maximum flow rate that can pass therethrough and a pooling of the oil below the intermediate hole 50 begins. When the oil begins to pool, in addition to pooling inside the first chamber 18, the oil also is forced up through the lower horizontal end 54 and the viewing portion 56 of the viewing conduit 14 forcing the float ball 58 up and into the viewing portion 56. The oil continues to pool with increasing flow rate until it reaches the intermediate outlet 50.

Upon reaching the intermediate outlet 50, oil in excess of the 3 gpm flow rate follows the path identified by arrow 69b and passes through the outlet 50 and associated passageway 26 from the first chamber 18 into the bypass duct 24. Fluid entering the bypass duct 24 passes downwardly therethrough and exits the bypass duct 24 through duct outlet 46 into the second chamber 20. Because the second chamber 20 has a greater diameter D2 than the first chamber D1, the second chamber 20 can accommodate a greater flow rate and therefore can accommodate fluid passing through both the first chamber 18 and the passageway 26.

Assuming that the flow rate into housing inlet 16 does not exceed 4 gpm, the oil entering the inlet passes through the first chamber 18 or passageway 26 and the oil level inside the first chamber 18 will not exceed an upper edge of the intermediate aperture 50. Therefore, despite rapid increases or decreases in the flow rate between 3 and 4 gpm, the rate of oil level change in the first chamber 18 will be relatively slow as any oil in excess of 3 gpm but below 4 gpm will simply pass through the passage 26 into the duct 24. For this reason, when the flow rate is in the ideal range (i.e. between 3 and 4 gpm), the float ball 58 remains at approximately the same level within the viewing portion 58 between level marks 64a and 64b.

Next, assuming that the flow rate is increased from below 4 gpm to a level thereabove, both the first chamber 18 and intermediate outlet 50 flow rates become saturated. Therefore, oil in excess of 4 gpm again begins to pool within the first chamber 18, this time above the intermediate outlet 50. Once again, the oil level inside the first chamber 18 increases and the float ball 58 inside the viewing conduit 14 follows suit, rising inside the viewing portion 56.

The oil level increases to the point where it reaches the upper outlet 44. At this point, oil in excess of 4 gpm follows the path identified by arrow 69c and passes through the upper outlet 44 into the bypass duct 24 and down into the second chamber 20 therebelow. Thus, the upper outlet 44 acts as an overflow outlet to allow oil in excess of the ideal flow rate to pass. When oil is passed through the upper outlet 44, the float ball 58 is forced up to a relatively high level (i.e. the level of the upper outlet 44) which is clearly outside the ideal range and above level mark 64a. An observer can easily identify the excess flow rate and adjust flow rate accordingly.

It should be appreciated that a very simple flow rate meter has been described which can be used to easily identify if a flow rate is within an ideal or acceptable range. With the present meter, when the flow rate is below an ideal range, ball 58 is at the bottom of the viewing conduit 14. When the flow rate initially enters the acceptable range, ball 58 relatively quickly rises to a level indicating that the ideal rate has been reached. While the flow rate is within the ideal range, ball 58 moves only minimally, if at all, within the viewing portion 56. However, immediately when the flow rate exceeds the upper level of the ideal range, ball 58 is relatively quickly forced up to a high level inside the viewing conduit 14.

It should be understood that the apparatus described above is only exemplary and does not limit the scope of this invention, and that various modifications could be made by those skilled in the art that would fall under the scope of the invention. While the meter is described as having a horizontal inlet near its upper end, clearly, the inlet could be positioned anywhere along the length of the meter where the inlet will open into the first chamber and, the inlet need not be horizontal. Furthermore, the invention could be used to clearly and easily indicate more than a single ideal or acceptable flow rate range. To this end, the meter could include more than a single intermediate outlet 50. A second intermediate outlet could be provided between the intermediate outlet 50 and the lower outlet 40 that is dimensioned to pass another known flow rate. The additional intermediate outlet, like the first intermediate outlet 50, would appreciably reduce the rate of ball 58 level change when the rate is within another range.

Thus, the scope of the invention should be determined from a reasonable interpretation of the appended claims and not by the details of the preferred embodiments discussed above.

We claim:

1. An oil reclamation system flow meter connectible between two conduits for measuring the flow of oil therethrough, the meter comprising:

a first housing forming a first chamber, an inlet leading into the first chamber and lower, intermediate and upper outlets leading out of the first chamber, the intermediate outlet formed above the lower outlet and the upper outlet formed above the intermediate outlet, said lower outlet having a reduced cross section relative to a cross section of the first chamber;

a second housing forming a bypass duct, the first chamber leading into the duct through both the intermediate and upper outlets, the duct forming a duct outlet below the intermediate outlet;

a third housing forming a second chamber below both the first chamber and the duct, the first chamber leading into the second chamber through the lower outlet and the duct leading into the second chamber through the duct outlet; and means for indicating the oil level in the first chamber.

2. The meter of claim 1 wherein the first, second and third housings are formed by a single housing.

3. The meter of claim 1 wherein the inlet is proximate the top of the first chamber.

4. The meter of claim 1 wherein the lower outlet is proximate the bottom of the first chamber.

5. The meter of claim 1 wherein the first chamber is vertically oriented and has a substantially uniform horizontal cross sectional area.

6. The meter of claim 1 wherein the first and second chambers are substantially vertical chambers.

7. The meter of claim 1 wherein the first housing also forms two apertures from the first chamber through the housing and the means for determining the oil level includes a non-opaque conduit secured to and traversing the distance between the two apertures.

8. The meter of claim 7 wherein an upper of the two apertures is formed above the inlet and a lower of the two apertures is formed between the lower and intermediate outlets.

9. The meter of claim 8 wherein the conduit has visible calibration markings which relate oil level therein to flow rate.

10. The meter of claim 1 wherein the intermediate outlet forms a passage that is angled downwardly from the first chamber to the duct.

11. The meter of claim 1 wherein the intermediate outlet includes several intermediate outlets leading from the first chamber into the duct and each of the intermediate outlets is formed at a different height than the others.

12. The meter of claim 1 wherein the duct includes two ducts each of which forms an outlet that leads into the second chamber, the intermediate outlet leads into the first duct and the upper outlet leads into the second duct.

13. The meter of claim 7 wherein the first chamber extends below the conduit.

14. The meter of claim 1 wherein the meter is used to indicate if an oil flow rate therethrough is within an ideal range, the ideal range defined by a minimum flow rate and a maximum flow rate, the lower outlet being dimensioned so that the highest rate of flow therethrough prior to a pooling of oil in the first chamber below the intermediate outlet is equal to the minimum flow rate and the intermediate outlet being dimensioned so that the highest rate of flow therethrough prior to a pooling of oil thereabove is equal to the maximum flow rate less the minimum flow rate.

15. An oil reclamation system flow meter connectible between two conduits for measuring the flow of oil therethrough, the meter comprising:

a housing forming a substantially vertical and cylindrical first chamber, a substantially cylindrical inlet leading into the first chamber and lower, intermediate and upper outlets leading out of the first chamber, the intermediate outlet formed above the lower outlet and the upper outlet formed above the intermediate outlet, the housing also forming a substantially vertical bypass duct, the first chamber leading into the duct through both the intermediate and upper outlets, the duct forming a duct outlet below the intermediate outlet, the housing also forming a second substantially vertical and cylindrical chamber below both the first chamber and the duct, the first chamber leading into the second chamber through the lower outlet and the duct leading into the second chamber through the duct outlet, the second chamber having a greater minimum cross sectional area than the first chamber, the housing also forming two apertures from the first chamber through the housing, an upper of the two apertures formed above the inlet and a lower of the two apertures formed between the lower and intermediate outlets; and a non-opaque conduit secured to and traversing the distance between the two apertures.

16. The meter of claim 15 wherein the inlet is proximate the top of the first chamber and the lower outlet is proximate the bottom of the first chamber.

17. The meter of claim 15 wherein the conduit has visible calibration markings which relate oil level therein to flow rate.

18. The meter of claim 15 wherein the meter is used to indicate if a oil flow rate therethrough is within an ideal range, the ideal range defined by a minimum flow rate and a maximum flow rate, the minimum cross sectional area of the first chamber dimensioned so that the highest rate of flow therethrough prior to a pooling of oil in the first chamber below the intermediate outlet is equal to the minimum flow rate and the intermediate outlet dimensioned so that the highest rate of flow therethrough prior to a pooling of oil thereabove is equal to the maximum flow rate less the minimum flow rate.

* * * * *